March 26, 1929.  V. G. MOSS ET AL  1,707,065
RUMBLE SEAT
Filed May 17, 1926  2 Sheets-Sheet 1

Inventors
Victor G. Moss
and Allan C. Taylor
by Wm. M. Monroe
Attorney

March 26, 1929.  V. G. MOSS ET AL  1,707,065
RUMBLE SEAT
Filed May 17, 1926    2 Sheets-Sheet 2
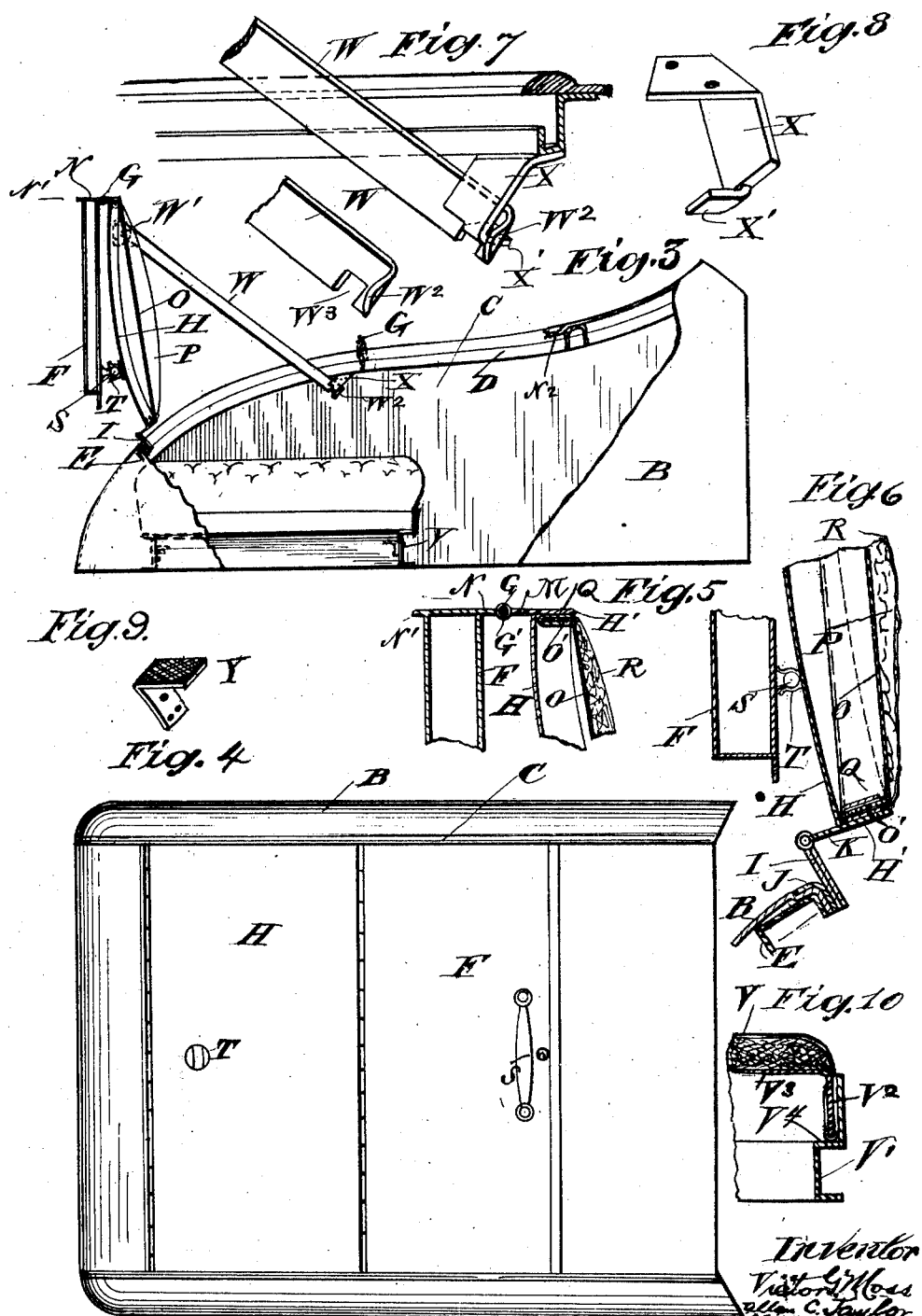

Patented Mar. 26, 1929.

1,707,065

UNITED STATES PATENT OFFICE.

VICTOR G. MOSS AND ALLAN C. TAYLOR, OF CLEVELAND, OHIO, ASSIGNORS TO AUTOMATIC SPECIALTIES CO., OF CLEVELAND, OHIO.

RUMBLE SEAT.

Application filed May 17, 1926. Serial No. 109,736.

The objects of the invention are to provide a rumble seat for a Ford car having the following features of advantage, namely: simplicity and scientific accuracy in construction and convenience in use, and affording a rigid, roomy and comfortable seat for two people in the rear deck of the car, without altering the original appearance or construction of the car.

It includes a swinging door or cover for the opening in the rumble, which is jointed to fold upon itself to provide a back for the seat.

It includes a detachable padded back cushion and a removable padded seat in the rumble. It includes attaching means for the cushioned back, and side bracing means therefor and locking brackets for the side braces which are secured to the original reinforcing members that encircle the sides of the opening.

It includes specific forms of hinge members and reinforcing plates therefor and also includes means for detachably securing the loose or forward portion of the hinged cover to the rear portion thereof when the cover is raised, to prevent the same from swinging on its hinges and striking against the other one.

It includes also the combination and arrangement of parts, hereinafter described, illustrated in the accompanying drawings and specifically pointed out in the claims.

Figure 1:
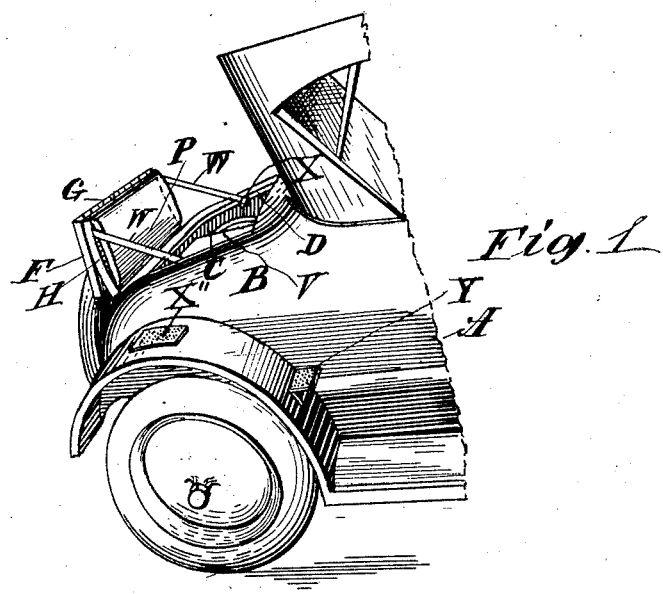
Figure 11:
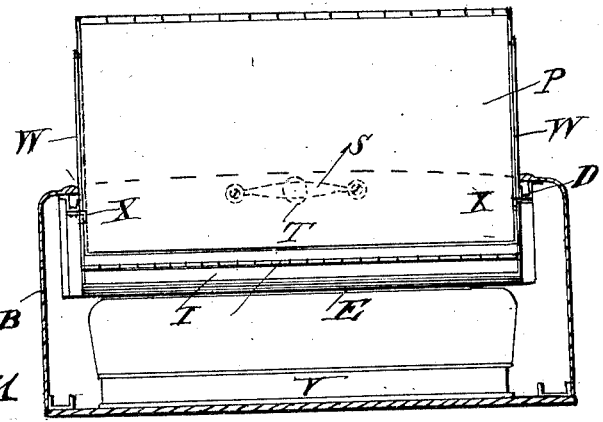
Figure 12:
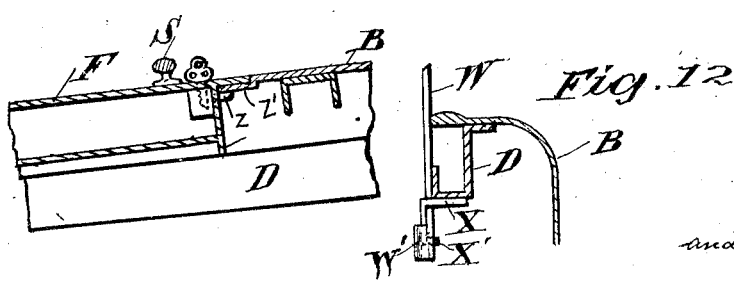

In the accompanying drawings Fig. 1 is a perspective of the rear end of a roadster embodying the device; Fig. 2 is a transverse section of the device; Fig. 3 is a side elevation of the device with parts broken away; Fig. 4 is a plan thereof; Fig. 5 is a vertical section (enlarged) of the upper hinge in the hinged cover; Fig. 6 is a similar view of the lower hinge; Figs. 7 and 8 are perspectives of the locking bracket or keeper for the lower ends of the side braces; Fig. 9 represents the side step mounted upon one of the rear fenders of the car. Fig. 10 is a transverse section of the seat; Fig. 11 is a section of cover showing the lock; Fig. 12 is a transverse section showing the bracket.

In these views A represents the body of the car; B is the rumble having the opening C in its upper side which is reinforced upon the side edges and rear edge by means of the channel bars D and E as shown in Figs. 2, 3 and 6. F is the front portion of the cover which is hinged at G to the rear portion H thereof which is hinged in turn to the metal plates I which are welded or brazed to the reinforcing angle plate J which lines the rear edge of the opening. This in turn is welded to the channel bar E underneath this edge, thus constructing a very strong and rigid hinge member.

The complementary hinge member upon the cover section comprises a plate K forming also the end of the cover H. The front portion F of the cover is hinged to the rear portion H as shown in Fig. 5. Here hinge plates M and N having complementary hinge eyes G' and pintle rod G are welded to the plates of the cover portions H and F, respectively, thus forming the abutting ends, of the respective members.

The rear portion H of the cover is open in front when raised and side flanges O' of the back plate O of the back cushion P are sprung or wedged between the end plates or flanges M of the rear portion. A U-shaped band in cross section Q is pressed over the flanges of the cushion back plate and binds the cover R of the cushion in place.

The front plate is hollow and is composed of two spaced plates, thus providing two finished surfaces, one of which is visible to the observer at all times.

The marginal plate N projects at N' so that when the cover is closed the projection will rest upon the channel bar N 2 (see Fig. 5) and form a solid support for the hinged part of the cover, and prevents the finished surface of the cover from being injured by contact with the bars D.

When the cover is raised and the front portion is folded back upon the rear portion, the handle S upon the front portion is inserted in a spring keeper T upon the rear portion, thus preventing the front portion from swinging upon its hinges.

The seat V is mounted upon a metal frame V' which rests upon the floor of the car and its rear edge passes underneath the rear edge of the opening in the top of the rumble.

Side braces W, W, are hinged at W', to the opposite sides of the back portion of the cover, and the braces are passed between the inner sides of the channel bars D, and the adjacent sides of the brackets X, X, which are secured to the undersides of said channel bars.

Each side brace is provided with an inwardly turned lower end or lug W², that prevents the brace from being drawn outwardly past the bracket and each brace is also provided with a notch or recess W³, the edges of which engage with the lug X¹, at the lower end of the bracket, and prevent the side brace from falling down.

Each bracket is made longer than the width of the adjacent brace so that the brace can be lifted away from the lug W², to release the brace when it is desired to close the cover.

At X″ is shown a padded step secured to the fender of the car and at Y is shown a rubber step pad upon which the occupants of the rumble may step to enter the rumble.

It will be observed that the rear portion of the cover is curved to correspond with the curvature of the back of the rumble body and the sheet metal seat back plate O is perfectly flat and extends from edge to edge of the curved lower portion in the manner of a chord of the curve thereof and the flanges O′ thereon are wedged within the marginal flanges H′ of the rear cover section H. In this manner resiliency is obtained for the seat back and the spring of the metal flanges holds the parts securely together.

At Z is shown a spring latch upon the forward edge of the front portion of the cover. When the cover is closed this latch engages underneath the front marginal flange Z′ of the opening and can only be released by means of a key shown in Fig. 11.

The seat cushion is attached to a base V′ as shown in Fig. 10.

The edges of the cushion cover are bent around a flange V² of a bottom member V³ which rests upon the shoulder V⁴ in the base.

Having described the invention, what we claim as new and desire to secure by Letters Patent is:

1. The combination with a hollow rumble having an opening in its upper wall, of a reinforcing bar attached to the rear edge of said opening underneath the same, said rear edge being also provided with an inwardly turned flange, an external angle bar positioned over said flange, a hinge plate mounted upon said angle bar, said hinge plate, external angle bar, flange and reinforcing bar being integrally attached together, and a folding cover for said opening, the rear portion of said cover being provided with an integral hinge plate pivotally connected to the first hinge plate.

2. In a rumble having an opening in its upper wall, a reinforcing bar upon the inner surface of said rumble about said opening, an angle bar welded over the rear edge of said opening and entering into a recess therein, a hinge plate welded thereto, a folding cover for said opening, the rear portion thereof being provided with a second hinge plate pivotally secured to the first mentioned hinge plate upon the rear edge of said opening.

In testimony whereof we hereunto affix our signatures.

VICTOR G. MOSS.
ALLAN C. TAYLOR.